Patented July 15, 1952

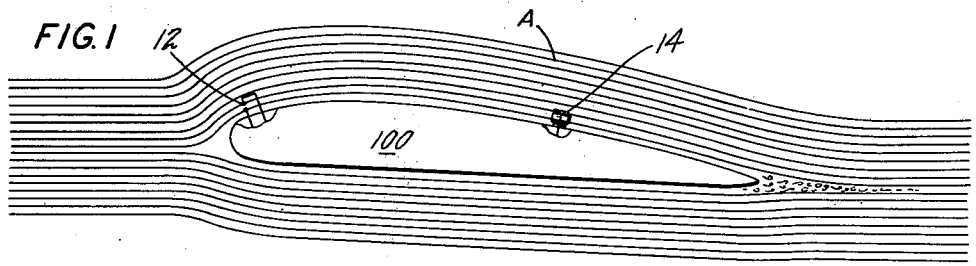
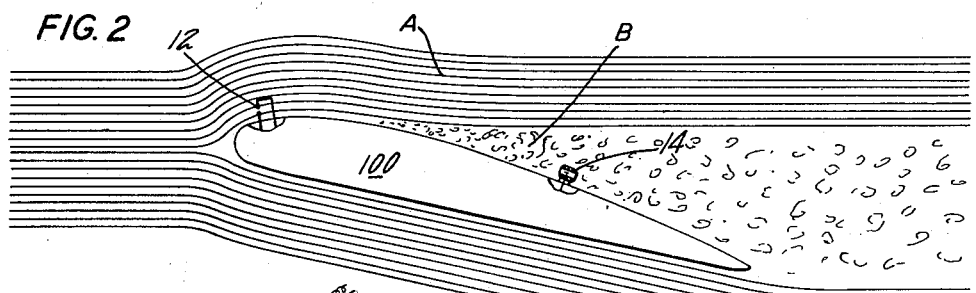
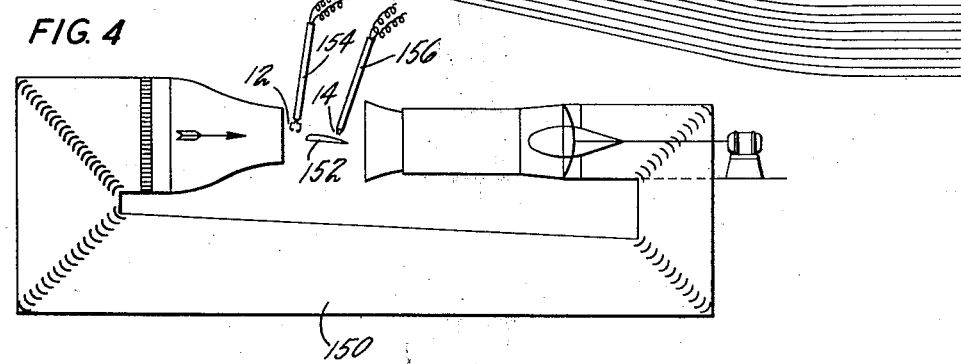
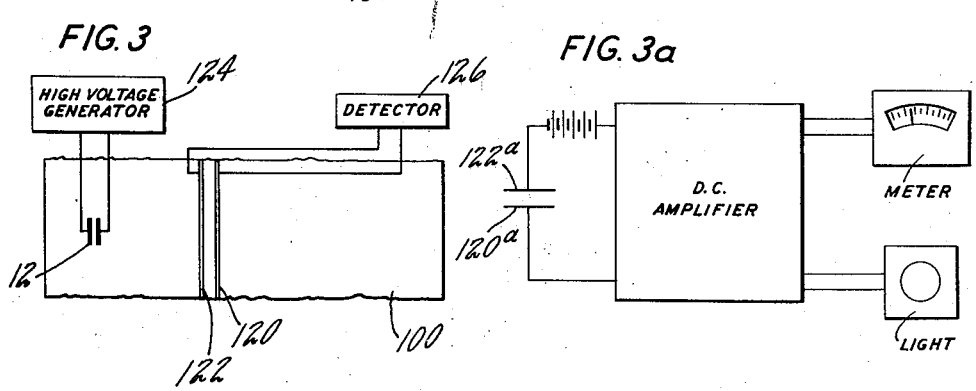
INVENTOR
PAUL J. CAMPBELL

2,603,695

UNITED STATES PATENT OFFICE 2,603,695

IONIZED AIR STALL DETECTOR

Paul J. Campbell, Middletown, Conn., assignor to United Aircraft Corporation, East Hartford, Conn., a corporation of Delaware Original application April 11, 1944, Serial No. 530,483. Divided and this application April 3, 1951, Serial No. 219,072

3 Claims. (Cl. 177—311)

This application is a division of application Serial No. 530,483, filed April 11, 1944, which matured into Patent No. 2,569,974, issued October 2, 1951.

This invention relates to the measurement of a flow characteristic of a free airstream.

An object of this invention is to provide an improved method and apparatus for measuring a flow characteristic, such as direction of flow of an airstream, and particularly of a free or unconfined airstream.

A further object of this invention is to contribute to the aircraft instrument art an instrument based on a new principle, utilizing ionized air reference regions, for indicating the nature of the airflow over an airfoil, and specifically for indicating the approach or presence of a stalling condition.

Other objects and advantages will be apparent from the specification and claims, and from the accompanying drawings which illustrate what is now considered to be a preferred embodiment of the invention.

Figs. 1 and 2 are schematic cross-sectional views of an airfoil having an ionizing device and a pickup or detector device thereon for indicating the approach of presence of a stalled condition by determining the nature of the airflow over the airfoil at varying angles of attack.

Figs. 3 and 3a are similar to Figs. 1 and 2 but show modifications of the pickup device.

Fig. 4 is a diagrammatic view of a wind tunnel installation, showing how the sending device, or spark gap, and the receiving device, or detector, of this invention may be utilized to determine the airflow characteristics of an airfoil.

According to this invention a section or portion of the fluid in a flowing fluidstream is ionized to render it electrically distinguishable from the remainder of the fluid in the fluidstream, yet the physical properties of said section or portion are not materially affected. Thus, the flow characteristics of the fluidstream are not materially altered and yet may be measured directly, by electrically sensing the passage or location of the electrically distinguishable fluid portion or ionized fluid region with respect to a point or points which are fixed relative to the fluidstream.

The ionizing and detecting devices of this invention may be used to indicate the presence of a stalled condition or the approach to a stalled condition of an airfoil. Airflow around an airfoil at normal angles of attack is substantially laminar or streamlined as shown at A in Fig. 1. When the angle of attack of the airfoil is varied beyond a certain point, the airfoil stalls, or the airflow A breaks away from the upper surface of the wing as shown in Fig. 2, the airflow over the rear or aft portion of the wing becoming turbulent as shown at B in Fig. 2. If the ionizing device 12 and the detector or pickup 14 are positioned as shown in Fig. 1, the ionized segments will travel from the sender 12 over the upper surface of the wing closely adjacent thereto and will be received by the pickup 14. But if the airfoil is stalled, the airflow will be pulled away or will be violently displaced relative to the rearward portions of the upper surface of the airfoil and the ionized segments will not contact the pickup 14, or else will be so dissipated throughout the airstream as to be incapable of actuating or operating the receiving apparatus. By properly positioning pickup 14 along the upper surface of the airfoil, chordwise thereof, failure of the pickup to produce impulses while the sending device 12 is functioning will indicate the presence of a stalled condition of the airfoil, or preferably the approach of a stalled condition, depending upon the location of the pickup.

For stall indicating purposes the ionized airstream need not be in longitudinal segments but can be made continuous or uninterrupted in a longitudinal direction. The sender may be continuously energized to constantly ionize a cross-sectional portion of the airstream passing over the upper surface of the airfoil. Under these conditions the pickup will be constantly energized by the charged air as long as the airfoil is within the normal range of angles of attack. When the airfoil exceeds this normal range and approaches the stalled condition, the airflow will begin to pull away or be turbulent at the rear portion of the airfoil, displacing the ionized air with respect to the pickup device, resulting in a failure of its indication or interruption of its operation, which may be utilized in a manner obvious to those skilled in the art to actuate a warning device to inform the pilot that the aircraft is in a dangerous attitude or at a dangerously low speed.

The arrangement of Figs. 1 and 2, which utilizes the coaxial or concentric electrode pickups, will also indicate a lateral movement of the ionized airstream relative to the pickup 14, or relative to the aircraft. Thus, this arrangement may also be utilized to indicate a slip or skid of the aircraft, as well as stall. If it is desired to prevent this result, the pickup device can be laterally elongated as shown in Fig. 3. Here the pickup comprises spaced electrical conductors 120, 122 which are insulated from each other and from the sending device 12. A high voltage generator 124 may be used to energize sender 12 and the detector apparatus 126 is connected to conductors 120, 122 to indicate the presence of ionized air between the conductors. Detector 126 may be simply a galvanometer, or a combined amplifier and microammeter for indicating changes in impedance of the air gap between conductors 120, 122. Thus as illustrated in Fig. 3a the conductors 120a, 122a, may be connected to a D. C. amplifier which in turn passes a signal to a meter and/or light. Conductors 120, 122 preferably lie close to or in the upper contour of the wing 100 and are elongated spanwise thereof. Thus, the charged airstream created by the sender 12 (which may be formed either as a continuous ionized stream in the direction of the airflow or in the form of segments) will contact the electrodes 120, 122 and actuate the detector 126 when the airfoil is within a safe range of angles of attack relative to the airstream, regardless of whether or not the airfoil is skidding or slipping relative to the airstream. Because electrodes 120, 122 are elongated laterally, the detector will still be actuated even though there is some movement of the charged airstream spanwise of the airfoil, after it leaves the sender 12. But when the airfoil approaches the stalled condition, the charged airstream will be deflected upwardly with respect to the airfoil, away from the conductors 120, 122 and the resulting cessation of the current flow to the detector may be utilized to operate a warning signal.

The flow direction principle applied to Figs. 1, 2 and 3 and 3a as a stall, slip, or skid indicating device may also be utilized for other purposes, as shown in Fig. 4. Here the wind tunnel 150 provides an airflow over airfoil 152. The sender 12 and pickup 14 are mounted on movable supports 154, 156, respectively, so that the direction of the airflow may be determined relative to the airfoil 152 by creating ionized air portions at a selected position within the airstream, the direction of flow being indicated by moving pickup 14 until an indication is noted, on a galvanometer or other electrical indicating device.

It is to be understood that the invention is not limited to the specific embodiments herein illustrated and described, but may be used in other ways without departure from the spirit of this novel concept.

I claim:

1. In a stall indicator for an aircraft airfoil, a device for creating an ionized streak of air in the airstream passing over the upper surface of said airfoil, a pickup device for sensing the position of the path of said ionized streak of air relative to said airfoil, and an indicator operatively connected to said pick-up device for indicating the presence of said ionized streak.

2. A stall detector for aircraft airfoils comprising, means for ionizing a portion of the airstream passing over said airfoil, means located on said airfoil downstream of said ionizing means at a position where the airflow is turbulent in the stalled condition and laminar in the non-stalled position for sensing the presence or absence at said position of said ionized air portion, and indicating means operatively connected to said sensing means for indicating the presence or absence of said portion.

3. In a stall indicator for an aircraft having a lifting surface, means located on said surface for ionizing a portion of the airstream passing over said surface, means located downstream of said ionizing means for sensing the presence or absence of said portion relative to a predetermined point spaced from said surface including spaced electrical pickups, and indicating means operatively connected to said pickups.

PAUL J. CAMPBELL.

REFERENCES CITED

The following references are of record in the file of this patent:

UNITED STATES PATENTS

| Number | Name | Date |
|---|---|---|
| 1,808,709 | Blake | June 2, 1931 |